(12) United States Patent
Joo et al.

(10) Patent No.: US 10,816,828 B2
(45) Date of Patent: Oct. 27, 2020

(54) MULTI-STACK GRAPHENE STRUCTURE AND DEVICE INCLUDING THE SAME

(71) Applicants: SAMSUNG ELECTRONICS CO., LTD., Suwon-si (KR); THE BOARD OF TRUSTEES OF THE LELAND STANFORD JR. UNIVERSITY, Stanford, CA (US)

(72) Inventors: Wonjae Joo, Seongnam-si (KR); Juhyung Kang, San Francisco, CA (US); Soojin Kim, Menlo Park, CA (US); Mark L. Brongersma, Redwood City, CA (US); Shanhui Fan, Stanford, CA (US)

(73) Assignees: SAMSUNG ELECTRONICS CO., LTD., Suwon-si (KR); THE BOARD OF TRUSTEES OF THE LELAND STANFORD JR. UNIVERSITY, Stanford, CA (US)

( * ) Notice: Subject to any disclaimer, the term of this patent is extended or adjusted under 35 U.S.C. 154(b) by 0 days.

(21) Appl. No.: 15/802,086

(22) Filed: Nov. 2, 2017

(65) Prior Publication Data
US 2018/0120595 A1     May 3, 2018

Related U.S. Application Data

(60) Provisional application No. 62/416,352, filed on Nov. 2, 2016.

(30) Foreign Application Priority Data

Dec. 2, 2016    (KR) .......................... 10-2016-0163899

(51) Int. Cl.
*G02F 1/01*     (2006.01)
*G02F 1/19*     (2019.01)
(Continued)

(52) U.S. Cl.
CPC ............ *G02F 1/0121* (2013.01); *G02F 1/011* (2013.01); *G02F 1/17* (2013.01); *G02F 1/19* (2013.01);
(Continued)

(58) Field of Classification Search
CPC ..................................................... G02F 1/0121
See application file for complete search history.

(56) References Cited

U.S. PATENT DOCUMENTS 8,507,895 B2 *   8/2013   Choi .................. H01L 51/5206
                                                            257/40
8,792,525 B2     7/2014   Fermann et al.
(Continued)

FOREIGN PATENT DOCUMENTS

CN         103995035 A     8/2014
CN         104020589 A     9/2014
(Continued)

OTHER PUBLICATIONS

Gao et al., High-Speed Electro-Optic Modulator Integrated with Graphene-Boron Nitride Heterostructure and Photonic Crystal Nanocavity, Nano Lett. 2015, 15, 2001-2005 (Year: 2015).*
(Continued)

*Primary Examiner* — Peter Radkowski
(74) *Attorney, Agent, or Firm* — Sughrue Mion, PLLC

(57) ABSTRACT

A multi-stack graphene structure includes a graphene stack that includes graphene layers including amorphous graphene and thin film dielectric layers. The graphene layers include amorphous graphene. The graphene layers and the thin dielectric layers are alternately stacked on one another. The multi-stack graphene structure also includes an electric field former configured to apply an electric field to the graphene layers.

22 Claims, 16 Drawing Sheets

(51) Int. Cl.
*G02F 1/17* (2019.01)
*G02F 1/015* (2006.01)

(52) U.S. Cl.
CPC .. *G02F 2001/0155* (2013.01); *G02F 2202/10* (2013.01)

(56) References Cited

U.S. PATENT DOCUMENTS

| | | | |
|---|---|---|---|
| 8,836,446 | B2 | 9/2014 | Sensale-Rodriguez et al. |
| 8,921,473 | B1 | 12/2014 | Hyman |
| 9,360,689 | B2 | 6/2016 | Liu et al. |
| 2010/0084631 | A1 | 4/2010 | Boland et al. |
| 2010/0264032 | A1 | 10/2010 | Bazant |
| 2010/0264832 | A1 | 10/2010 | Archenhold et al. |
| 2011/0127497 | A1* | 6/2011 | Choi .......... H01L 51/5206 257/40 |
| 2012/0129269 | A1 | 5/2012 | Choi et al. |
| 2013/0003066 | A1 | 1/2013 | Han et al. |
| 2015/0109806 | A1 | 4/2015 | Ahn et al. |
| 2015/0221823 | A1 | 8/2015 | Hwang et al. |
| 2015/0276677 | A1 | 10/2015 | Li et al. |
| 2015/0362762 | A1 | 12/2015 | Williams |
| 2016/0009560 | A1 | 1/2016 | Kaya et al. |
| 2016/0033401 | A1 | 2/2016 | Farmer |
| 2016/0041030 | A1 | 2/2016 | Saxena et al. |
| 2016/0080092 | A1 | 3/2016 | Avouris et al. |
| 2016/0209680 | A1 | 7/2016 | Chen et al. |

FOREIGN PATENT DOCUMENTS

| | | |
|---|---|---|
| EP | 3007199 A1 | 4/2016 |
| JP | 2013-127953 A | 6/2013 |
| KR | 10-2012-0030780 A | 3/2012 |
| KR | 10-2013-0001705 A | 1/2013 |
| KR | 10-2016-0044977 A | 4/2016 |
| WO | 2012/145247 A1 | 10/2012 |
| WO | 2013/186985 A1 | 12/2013 |
| WO | 2015/031788 A1 | 3/2015 |
| WO | 2016/028680 A1 | 2/2016 |

OTHER PUBLICATIONS

Rathi et al., Tunable Electrical and Optical Characteristics in Monolayer Graphene and Few-Layer MoS2 Heterostructure Devices, Nano Lett. 2015, 15, 5017-5024 (Year: 2015).*

Tyagi et al., Multilayer graphene as a transparent conducting electrode in silicon heterojunction solar cells. AIP Advances. AIP Advances 5, 077165 (2015). 10.1063/1.4927545. (Year: 2015).*
Ye et al., Electro-absorption optical modulator using dual-graphene-on-graphene configuration, Opt. Express 22, 26173-26180 (2014) (Year: 2014).*
Chen et al., Large-scale and patternable graphene: direct transformation of amorphous carbon film into graphene/graphite on insulators via Cu mediation engineering and its application to all-carbon based devices, Nanoscale, Jul. 2015, 1678-1687 | (Year: 2015).*
Chen et al., "Design of a high-efficiency grating coupler based on a silicon nitride overlay for silicon-on-insulator waveguides," Appl. Opt. 49, 6455-6462 (2010) (Year: 2010).*
Geim, A.K. (2009) Graphene: Status and Prospects. Science, 324, 1530-1534. http://dx.doi.org/10.1126/science.1158877 (Year: 2009).*
Koo et al., Characteristics of Hafnium-Aluminum-Oxide Thin Films Deposited by Using Atomic Layer Deposition with Various Aluminum Compositions, Journal of the Korean Physical Society, vol. 47, No. 3, Sep. 2005, pp. 501_50 (Year: 2005).*
Li et al., Hybrid thin films of graphene nanowhiskers and amorphous carbon as transparent conductors, Chem. Commun., 2010, 46, 3502-3504 (Year: 2010).*
Liu et al., Double-Layer Graphene Optical Modulator, Nano Lett. 2012, 12, 3, 1482-1485 (Year: 2012).*
Low et al., Graphene Plasmonics for Terahertz to Mid-Infrared Applications, Review, ACS Nano, V. 8, N. 2, pp. 1086-1101, 2014 (Year: 2014).*
Smirnova et al., Tunable nonlinear graphene metasurfaces, Phys. Rev. B 92, 161406(R)—Published Oct. 14, 2015 (Year: 2015).*
Wang et al., Highly Sensitive and Wide-Band Tunable Terahertz Response of Plasma Waves Based on Graphene Field Effect Transistors, Scientific Reports | 4 : 5470 | DOI: 10.1038/srep05470, 2014 (Year: 2014).*
Li, et al., "Graphene Plasmonic Metasurfaces to Steer Infrared Light" 2015, Scientific Reports, vol. 5, Article No. 12423, 40 pages total.
Smirnova, et al., "Tunable nonlinear graphene metasurfaces", 2015, Physics.optics, 6 pages total.
Yao, et al., "Electrically Tunable Metasurface Perfect Absorbers for Ultrathin Mid-Infrared Optical Modulators", 2014, American Chemical Society, pp. 6,526-6,532.
Li, et al., "Dirac charge dynamics in graphene by infrared spectroscopy", 2008, Nature Physics, vol. 4, pp. 532-535.
Mak, et al., "Optical spectroscopy of graphene: From the far infrared to the ultraviolet", 2012, Solid State Communications, vol. 152, pp. 1,341-1,349.
Kim, et al., "Ultrafast zero balance of the oscillator-strength sum rule in graphene", 2013, Scientific Reports, Article No. 2663, 32 pages total.

* cited by examiner

MULTI-STACK GRAPHENE STRUCTURE AND DEVICE INCLUDING THE SAME

CROSS-REFERENCE TO RELATED APPLICATION

This application claims the benefit of U.S. Provisional Application No. 62/416,352, filed on Nov. 2, 2016 in the U.S. Patent Trademark Office, and priority from Korean Patent Application No. 10-2016-0163899, filed on Dec. 2, 2016 in the Korean Intellectual Property Office, the disclosures of which are incorporated by reference herein in their entireties.

BACKGROUND

1. Field

The present disclosure relates to a multi-stack graphene structure and a device including the same.

2. Description of the Related Art

Recently, active research has been conducted into graphene applicable to various fields such as nanoelectronics, optoelectronics, chemical sensors, and the like. Graphene is literally a crystalline material having a hexagonal honeycomb structure in which carbon atoms are two-dimensionally (2D) connected. Graphene can be modified to be amorphic and it can be called amorphous graphene for convenience. Graphene has a very small thickness (of an atomic size) and advantages such as high electric mobility, excellent thermal characteristics, and chemical stability. Graphene may be obtained by synthesis through chemical vapor deposition (CVD) or by detaching graphite layers one by one.

SUMMARY

Example embodiments provide multi-stack graphene structures and devices including the same.

According to an aspect of an example embodiment, there is provided a multi-stack graphene structure including an amorphousgraphene stack that includes amorphous graphene layers and thin film dielectric layers. The amorphous graphene layers and the thin dielectric layers are alternately stacked on one another. The multi-stack graphene structure also includes an electric field former configured to apply an electric field to the graphene layers.

The multi-stack graphene structure may include two or more graphene stacks (layers may be better than stacks).

The amorphous graphene may be present in a form of a pattern.

The pattern may include any one of a one-dimensional (1D) pattern and a two-dimensional (2D) pattern.

The amorphous graphene may be an amorphous single carbon atomic layer in which carbon atoms are connected with sp2 hybridized bonds.

Each of the thin film dielectric layers may have a thickness less than 20 nm.

The thin film dielectric layers may be formed by using atomic layer deposition (ALD).

The thin film dielectric layers may include at least one of $Al_2O_3$, $HfO_2$, $SiO_2$, $Si_3N_4$, $ZrO_2$, and $Ta_2O_5$.

According to an aspect of another example embodiment, there is provided a multi-stack graphene structure including a plurality of graphene layers spaced apart from one other. The plurality of graphene layers include amorphous graphene. Thin film dielectric layers are provided between the plurality of graphene layers. The multi-stack graphene structure also includes an electric field former configured to apply an electric field to each of the plurality of graphene layers The amorphous graphene may be present in the form a pattern.

Each of the thin film dielectric layers may have a thickness less than 20 nm.

The thin film dielectric layers may be formed by using ALD.

According to an aspect of another example embodiment, there is provided a device including the multi-stack graphene structure.

The device may further include: a substrate, a gate on the substrate and a gate oxide on the gate, wherein the multi-stack graphene structure is on the gate oxide.

The device may further include a reflecting layer between the substrate and the gate oxide.

The gate oxide and the thin film dielectric layers may include the same material.

The gate oxide and the thin film dielectric layers may alternatively include different materials.

The device may further include a substrate and a waveguide on the substrate, wherein the multi-stack graphene structure is on an upper portion or a lower portion of the waveguide.

The device may further include a light source configured to irradiate light onto one surface of the waveguide.

The device may further include a dielectric layer between the waveguide and the multi-stack graphene structure.

The device may further include a grating in at least one surface of the waveguide and may be configured to couple light to an inside of the waveguide or emit the light to an outside of the waveguide.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
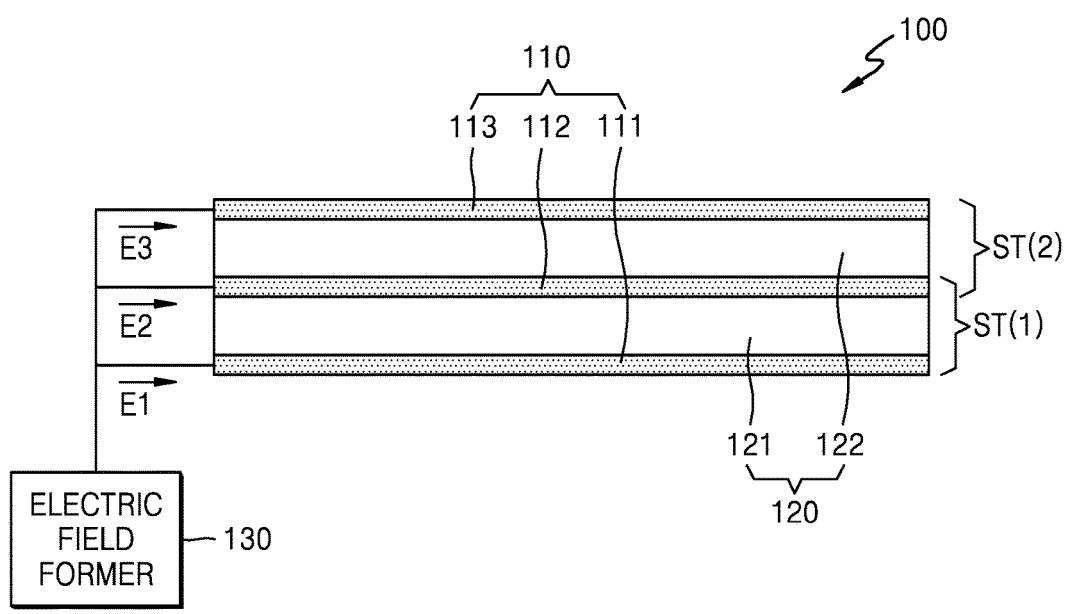
FIG. 1 is a schematic cross-sectional view of a multi-stack graphene structure according to an example embodiment.

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. Expressions such as "at least one of," when preceding a list of elements, modify the entire list of elements and do not modify the individual elements of the list.

In the drawings, the sizes of constituent elements may be exaggerated for clarity. It will be understood that, although the terms first, second, and the like may be used herein to describe various elements, these elements are not limited by these terms. These terms are only used to distinguish one element from another.

As used herein, the singular forms "a", "an", and "the" are intended to include the plural forms as well, unless the context clearly indicates otherwise. In addition, it will be understood that when a unit is referred to as "comprising" or "including" an element, it may further include another element unless specifically indicated otherwise.

Multi-stack graphene structures and a devices including the same will now be described in detail according to embodiments, examples of which are illustrated in the accompanying drawings.

Graphene is an allotrope of carbon. Graphene may have a two-dimensional (2D) planar structure formed by a plurality of carbon atoms. The carbon atoms forming graphene may have a hexagonal crystalline structure, with the carbon atoms located at vertexes of the hexagon. The crystalline structure of graphene may be formed via a $sp^2$ bond structure in which three bonds are formed per vertex. Such a crystalline structure in graphene may have high stability. Graphene may also have three chemical bonds having an angle of 120 degrees per carbon atom, and thus graphene may have a completely planar structure. Graphene may be formed as a thin film having the thickness of a single atom.

When graphene is grown using a chemical vapor deposition (CVD) process, graphene having a crystalline structure may grow on a substrate having a similar crystalline structure to that of graphene by applying a temperature of about 1000° C. The similarity of the crystalline structures may be determined using the lattice mismatch between graphene and the substrate. For example, copper (Cu) or nickel (Ni) having a face centered cubic (fcc) crystalline structure may have a low lattice mismatch of less than about 5% with graphene. Such copper (Cu) or nickel (Ni) may be a transition metal used to easily grow crystalline graphene.

Amorphous graphene may include a carbon layer having an amorphous bond structure with the thickness of a single atom. Amorphous graphene may include a plurality of pentagonal and heptagonal carbon bond structures while maintaining the $sp^2$ bond structure. That is, amorphous graphene may be graphene having a random carbon bond structure.

The crystalline structure of the substrate that functions as the catalyst for amorphous graphene may be different from the crystalline structure of the substrate that functions as a catalyst for crystalline graphene. When graphene growth is performed through CVD at a high temperature ranging from about 900° C. to about 1100° C., if the process conditions including very low solubility of carbon and fast growth speed are maintained, a carbon layer having an amorphous bond structure with the thickness of a single atom may be formed. The substrate used to form amorphous graphene may include a germanium crystalline structure. Amorphous graphene may be used in a device having a stacked multi-layer structure. Alternatively, amorphous graphene may be described as an amorphous carbon monolayer (ACM) with $sp^2$ hybridized bonds consisting of a monolayer of carbon atoms.

Since amorphous graphene has $sp^2$ bond carbon atoms, like crystalline graphene, amorphous graphene may also have the characteristics of electric conductivity, light absorption, and the occurrence of a photoelectron by π-a bond. It may be very difficult to form a high quality thin film dielectric layer of less than 20 nm thickness on a surface of crystalline graphene. Amorphous graphene may have various carbon ring structures, including those of a pentagon, a hexagon, and a heptagon so as to have a local difference in surface energy. Thus, amorphous graphene may physically adsorb a precursor on the surface thereof, which makes it possible to grow a high quality thin film dielectric layer. By using such characteristics of amorphous graphene, a high quality thin film dielectric layer of less than 20 nm thickness may be formed on amorphous graphene. Thus, a multi-stack graphene having a small thickness may be formed by alternately stacking amorphous graphene and thin film dielectric layers. That is, amorphous graphene may have the characteristics of electric conductivity, light absorption, the occurrence of a photoelectron by the $sp^2$ bond, and a local difference in surface energy so as to form a thin film dielectric layer of less than 20 nm in thickness on amorphous graphene.

Figure 2:
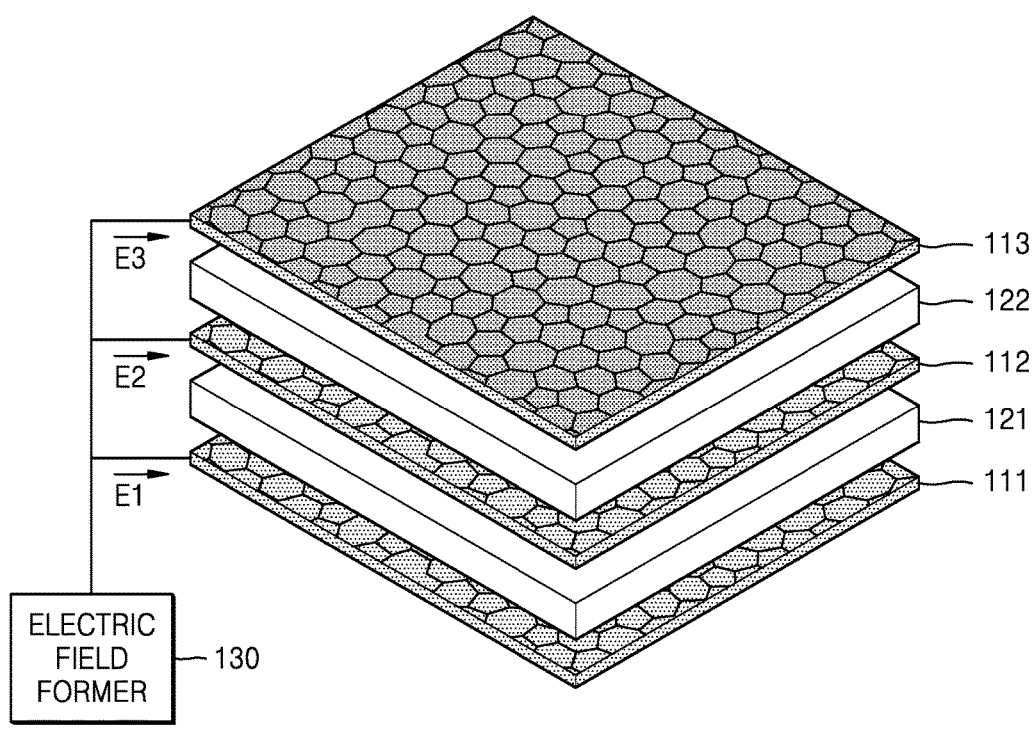
FIG. 2 is a schematic perspective view of the multi-stack graphene structure of FIG. 1 according to an example embodiment.

FIG. 1 is a schematic cross-sectional view of a multi-stack graphene structure 100 according to an example embodiment. FIG. 2 is a schematic perspective view of the multi-stack graphene structure 100 of FIG. 1 according to an example embodiment.

Referring to FIGS. 1 and 2, the multi-stack graphene structure 100 may include a graphene layer 110, a thin film dielectric layer 120, and an electric field former 130. The multi-stack graphene structure 100 may include a plurality of graphene stacks ST1 and ST2. Each of the graphene stacks ST1 and ST2 may include at least one graphene layer 110 and at least one thin film dielectric layer 120.

The graphene layer 110 may include a first graphene layer 111, a second graphene layer 112, and a third graphene layer 113. The graphene layer 110 may comprise amorphous graphene. Referring to FIG. 2, the first graphene layer 111, the second graphene layer 112, and the third graphene layer 113 may be amorphous graphene layers having a planar shape. For example, the first graphene layer 111, the second graphene layer 112, and the third graphene layer 113 may be amorphous single carbon atomic layers including monolayer carbon atoms. In addition, according to another example, each of the first graphene layer 111, the second graphene layer 112, and the third graphene layer 113 may have a thickness of less than 1 nm. A thickness of crystalline graphene may be approximately 0.35 nm. The pentagonal and heptagonal carbon bond structures of amorphous graphene may not be completely planar structures. A single atomic layer of amorphous graphene in which buckling occurs may therefore have a thickness ranging from about 0.4 nm to about 0.5 nm.

The thin film dielectric layer 120 may include a first thin film dielectric layer 121 and a second thin film dielectric layer 122. The thin film dielectric layer 120 may include various kinds of dielectric materials. For example, the thin film dielectric layer 120 may include at least one of $Al_2O_3$, $HfO_2$, $SiO_2$, $Si_3N_4$, $ZrO_2$, and $Ta_2O_5$. The thin film dielectric layer 120 may have a thickness of less than 20 nm. As an example, the thin film dielectric layer 120 may be directly formed on the graphene layer 110 that includes amorphous graphene via atomic layer deposition (ALD). As another example, the first thin film dielectric layer 121 may be formed on the first graphene layer 111 that includes amorphous graphene via ALD. Further, in another example, the second thin film dielectric layer 122 may be formed on the second graphene layer 112 that includes amorphous graphene via ALD.

The thin film dielectric layer 120 may be a multi-layer structure. For example, the thin film dielectric layer 120 may include a plurality of layers including various kinds of dielectric materials. As a further example, at least one of the first thin film dielectric layer 121 and the second thin film dielectric layer 122 may be a multi-layer structure. The structure and material of the thin film dielectric layer 120 may be determined based on a specific desired operating condition of the multi-stack graphene structure 100.

The plurality of graphene stacks ST1 and ST2 may include a first graphene stack ST1 and a second graphene stack ST2. Each of the first graphene stack ST1 and the second graphene stack ST2 may have a structure in which the graphene layer 110 that includes amorphous graphene and the thin film dielectric layer 120 are stacked. For example, each of the first graphene stack ST1 and the second graphene stack ST2 may include two spaced graphene layers 110 and the thin film dielectric layer 120 interposed between the two spaced graphene layers 110. As shown in FIG. 2, there are empty spaces between the two spaced graphene layers 110 (layers 111, 112, and 113, corresponding to FIG. 1) and the thin film dielectric layer 120 (layers 121 and 122, corresponding to FIG. 1) interposed between the two spaced graphene layers. However, this is only for convenience of illustration and the present disclosure is not limited thereto. For example, the thin film dielectric layer 120 may be inserted between the two spaced graphene layers 110 such that no empty spaces are formed therebetween. Also, the thin film dielectric layer 120 may include a monolayer in FIG. 2 (see, e.g., layers 121 and 122, corresponding to FIG. 1), but the present disclosure is not limited thereto.

The first graphene stack ST1 may include the first graphene layer 111, the first thin film dielectric layer 121, and the second graphene layer 112. The second graphene stack ST2 may include the second graphene layer 112, the second thin film dielectric layer 122, and the third graphene layer 113. As an example, the first graphene stack ST1 and the second graphene stack ST2 may share the second graphene layer 112. As the number of the plurality of graphene stacks ST1 and ST2 increases, efficiency of an optical modulation of the multi-stack graphene structure 100 may be enhanced.

The electric field former 130 may apply an electric field to the graphene layer 110. For example, the electric field former 130 may separately apply a voltage to each of the first graphene layer 111, the second graphene layer 112, and the third graphene layer 113. As a further example, the electric field former 130 may apply an electric field E1 to the first graphene layer 111, an electric field E2 to the second graphene layer 112, and an electric field E3 to the third graphene layer 113. The electric field former 130 may apply the electric field to the graphene layer 110, thereby modulating electro-optic characteristics of the multi-stack graphene structure 100. As another example, the electric field former 130 may apply the electric field to the graphene layer 110, thereby modulating light characteristics such as amplitude or phase of light applied to the multi-stack graphene structure 100.

Figure 3:
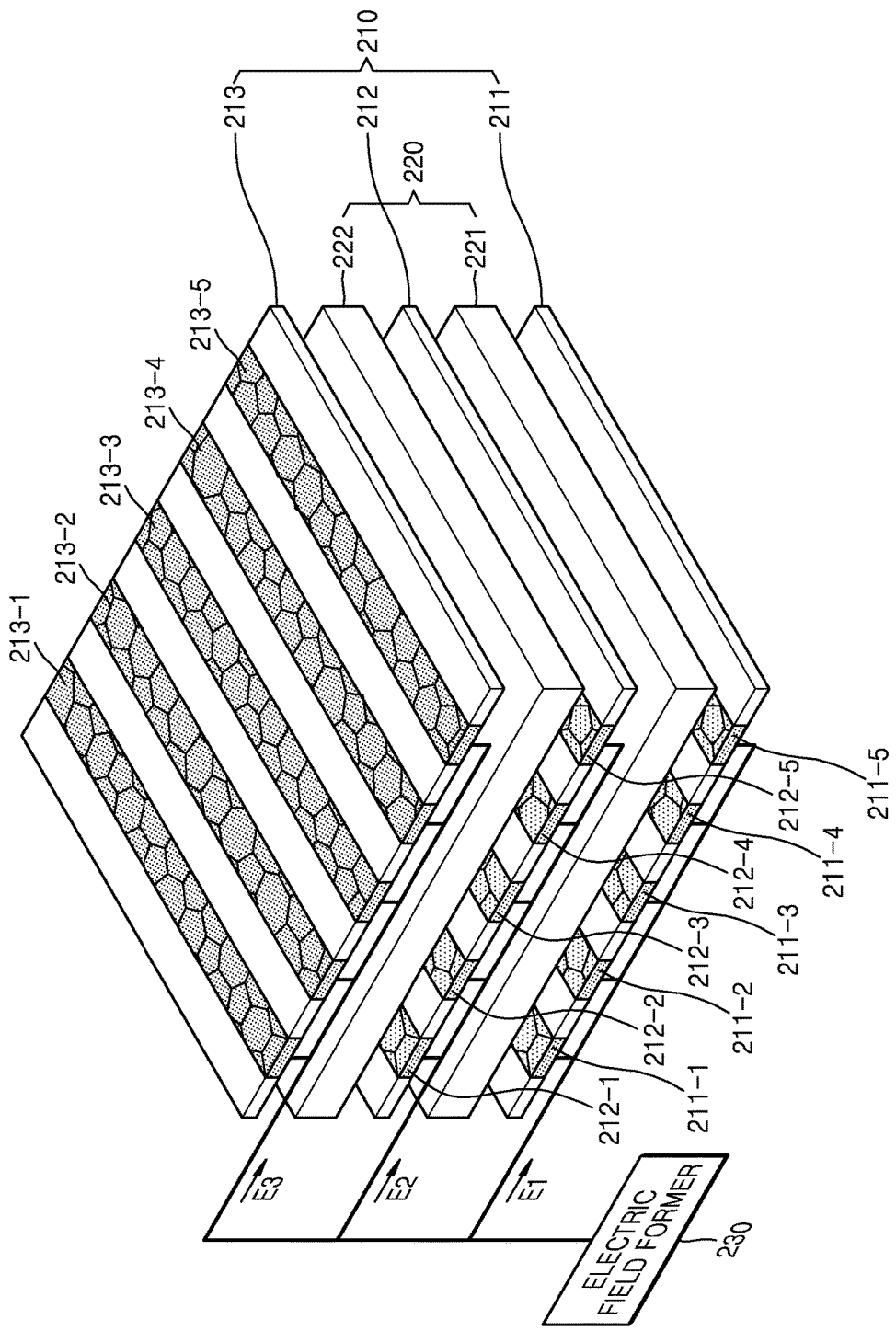
FIG. 3 is a schematic cross-sectional view of a multi-stack graphene structure according to another example embodiment.

FIG. 3 is a schematic cross-sectional view of a multi-stack graphene structure 200 according to another example embodiment. Referring to FIG. 3, the multi-stack graphene structure 200 may include a graphene layer 210, a thin film dielectric layer 220, and an electric field former 230.

The graphene layer 210 may include patterns of amorphous graphene. The graphene layer 210 may include a first graphene layer 211 containing amorphous graphene patterns, a second graphene layer 212 containing amorphous graphene patterns, and a third graphene layer 213 containing amorphous graphene patterns. The first graphene layer 211 may contain amorphous graphene patterns 211-1, 211-2, 211-3, 211-4, and 211-5. The second graphene layer 212 may contain amorphous graphene patterns 212-1, 212-2, 212-3, 212-4, and 212-5. The third graphene layer 213 may contain amorphous graphene patterns 213-1, 213-2, 213-3, 213-4, and 213-5.

As examples, the amorphous graphene patterns may be one-dimensional patterns or two-dimensional patterns. For example, the one-dimensional patterns may be linear stripe patterns. In another example, when the amorphous graphene is a one-dimensional pattern, the multi-stack graphene structure 200 may have a beam steering function. As another example, the two-dimensional patterns may contain various shapes of two-dimensionally arranged amorphous graphene patterns. For example, amorphous graphene may be in a shape of a circle, an oval, a square, a rectangle, and a polygon and may be two dimensionally arranged. For example, when amorphous graphene is a two-dimensional pattern, the multi-stack graphene structure 200 may function as a tunable metasurface lens. Referring to FIG. 3, the first graphene layer 211 may include a 1-1th amorphous graphene pattern 211-1, a 1-2th amorphous graphene pattern 211-2, a 1-3th amorphous graphene pattern 211-3, a 1-4th amorphous graphene pattern 211-4, and a 1-5th amorphous graphene pattern 211-5 that form the linear stripe patterns. For example, the 1-1th amorphous graphene pattern 211-1, the 1-2th amorphous graphene pattern 211-2, the 1-3th amorphous graphene pattern 211-3, the 1-4th amorphous graphene pattern 211-4, and the 1-5th amorphous graphene pattern 211-5 may be spaced apart from each other by a predetermined gap. As another example, a region of the first graphene layer 211 that does not include an amorphous graphene region may include a dielectric material. As an example, the dielectric material may be the same as that of the thin film dielectric layer 220, but the present disclosure is not limited thereto. In another example, the dielectric material may include air. In fact, because the thickness of graphene layer is much smaller than that of dielectric layer, the absent region of graphene layer is negligible.

Referring to FIG. 3, the second graphene layer 212 may include a 2-1th amorphous graphene pattern 212-1, a 2-2th amorphous graphene pattern 212-2, a 2-3th amorphous graphene pattern 212-3, a 2-4th amorphous graphene pattern 212-4, and a 2-5th amorphous graphene pattern 212-5 that form the linear stripe patterns. The third graphene layer 213 may include a 3-1th amorphous graphene pattern 213-1, a 3-2th amorphous graphene pattern 213-2, a 3-3th amorphous graphene pattern 213-3, a 3-4th amorphous graphene pattern 213-4, and a 3-5th amorphous graphene pattern 213-5 that form the linear stripe patterns.

For example, when the graphene layer 110 is viewed in a direction perpendicular to a plane, the amorphous graphene patterns 211-1, 211-2, 211-3, 211-4, and 211-5 of the first graphene layer 211 and the amorphous graphene patterns 212-1, 212-2, 212-3, 212-4, and 212-5 of the second graphene layer 212 may be aligned with each other. In another example, when the graphene layer 110 is viewed in the direction perpendicular to the plane, the amorphous graphene patterns 212-1, 212-2, 212-3, 212-4, and 212-5 of the second graphene layer 212 and the amorphous graphene patterns 213-1, 213-2, 213-3, 213-4, and 213-5 of the third graphene layer 213 may be aligned with each other. However, the present disclosure is not limited thereto. The amorphous graphene patterns may be slightly misaligned with respect to each other. For example, different amorphous graphene in the graphene layer 210 may face each other so as to form an electric field. As an example, the amorphous graphene of the graphene layer 210 may face each other so as to function as a resonator.

The thin film dielectric layer 220 may include a first thin film dielectric layer 221 interposed between the first graphene layer 211 and the second graphene layer 212, and a second thin film dielectric layer 222 interposed between the second graphene layer 212 and the third graphene layer 213. The thin film dielectric layer 220 is the same as described above with reference to FIGS. 1 and 2.

The electric field former 230 may apply an electric field to the graphene layer 210. For example, the electric field former 230 may separately apply voltage to each of the first graphene layer 211, the second graphene layer 212, and the third graphene layer 213. As an example, the electric field former 230 may apply the electric field E1 to the first graphene layer 211, the electric field E2 to the second graphene layer 212, and the electric field E3 to the third graphene layer 213. As another example, the electric field former 230 may apply different electric fields to the amorphous graphene patterns 211-1, 211-2, 211-3, 211-4, and 211-5 of the first graphene layer 211, the amorphous graphene patterns 212-1, 212-2, 212-3, 212-4, and 212-5 of the second graphene layer 212, and the amorphous graphene patterns 213-1, 213-2, 213-3, 213-4, and 213-5 of the third graphene layer 213.

Figure 4:
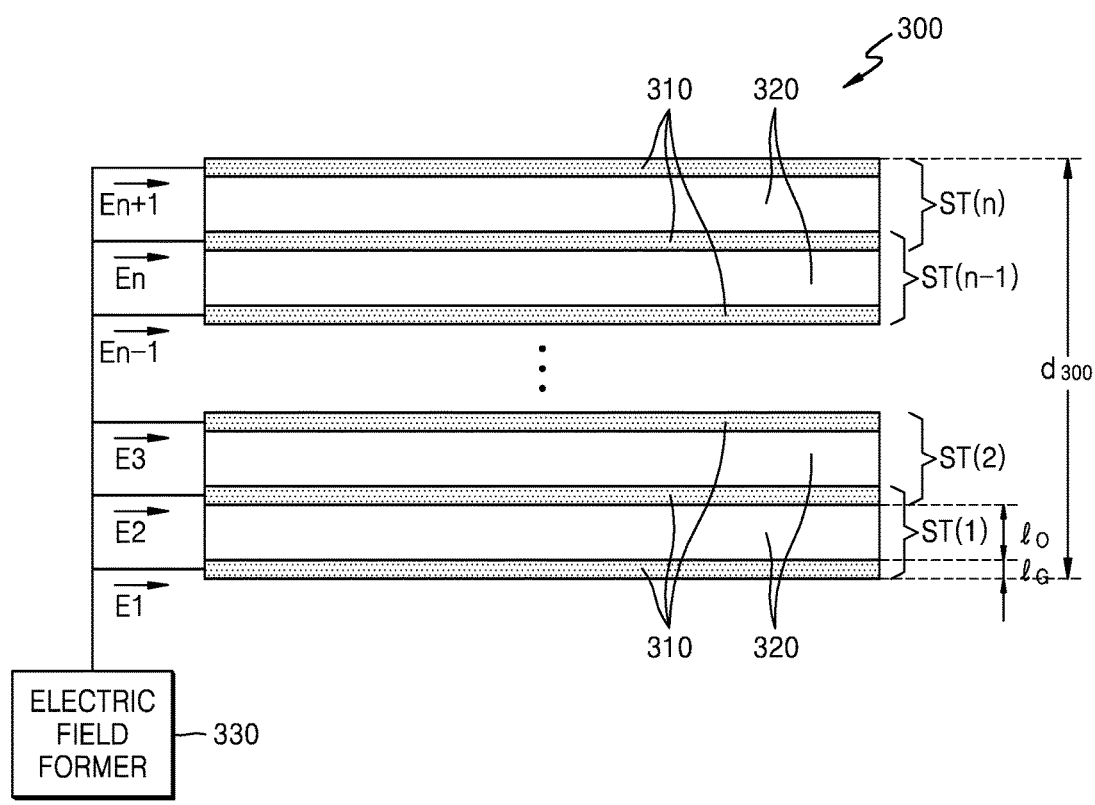
FIG. 4 is a schematic cross-sectional view of a multi-stack graphene structure according to another example embodiment.

FIG. 4 is a schematic cross-sectional view of a multi-stack graphene structure 300 according to another example embodiment.

Referring to FIG. 4, the multi-stack graphene structure 300 may include a graphene layer 310, a thin film dielectric layer 320, and an electric field former 330. The multi-stack graphene structure 300 may include n graphene stacks ST(1), ST(2), . . . , ST(n−1), ST(n). Each of the graphene stacks ST(1), ST(2), . . . , ST(n−1), ST(n) may include at least one graphene layer 310 and at least one thin film dielectric layer 320.

Referring to FIG. 4, the n graphene stacks ST(1), ST(2), . . . , ST(n−1), ST(n) may include two spaced graphene layers 310 and the thin film dielectric layer 320 interposed between the two spaced graphene layers 310. For example, the first graphene stack ST(1) and the second graphene stack ST(2) may share a graphene layer 310. As a further example, the n−1$^{st}$ graphene stack ST(n−1) and the nth graphene stack ST(n) may share a graphene layer 310. As another example, as the number of the graphene stacks ST(1), ST(2), . . . , ST(n−1), ST(n) increases, efficiency of an optical modulation of the multi-stack graphene structure 300 may be enhanced. For a reduction in formation costs and for efficiency of formation, the multi-stack graphene structure 300 may have a small thickness $d_{300}$. As an example, the thickness $d_{300}$ of the multi-stack graphene structure 300 in which n=10 may be less than 50 nm. As another example, a sum of a thickness $l_G$ of the graphene layer 310 and a thickness $l_0$ of the thin film dielectric layer 320 may be less than 3 nm. The multi-stack graphene structure 300 according to the present embodiment may include the graphene layer 310 that includes amorphous graphene, and thus the multi-stack graphene structure 300 may satisfy a condition that the sum of the thickness $l_G$ of the graphene layer 310 and the thickness $l_0$ of the thin film dielectric layer 320 is less than 3 nm. However, if conventional crystalline graphene were used, since a thickness of a small thin film dielectric layer in such a case exceeds 30 nm, the multi-stack graphene structure 300 having a small thickness may not be easily obtained. In FIG. 4, electrical fields En−1, En, and En+1 are also shown, which supply electric fields to the respective layers.

Figure 5:
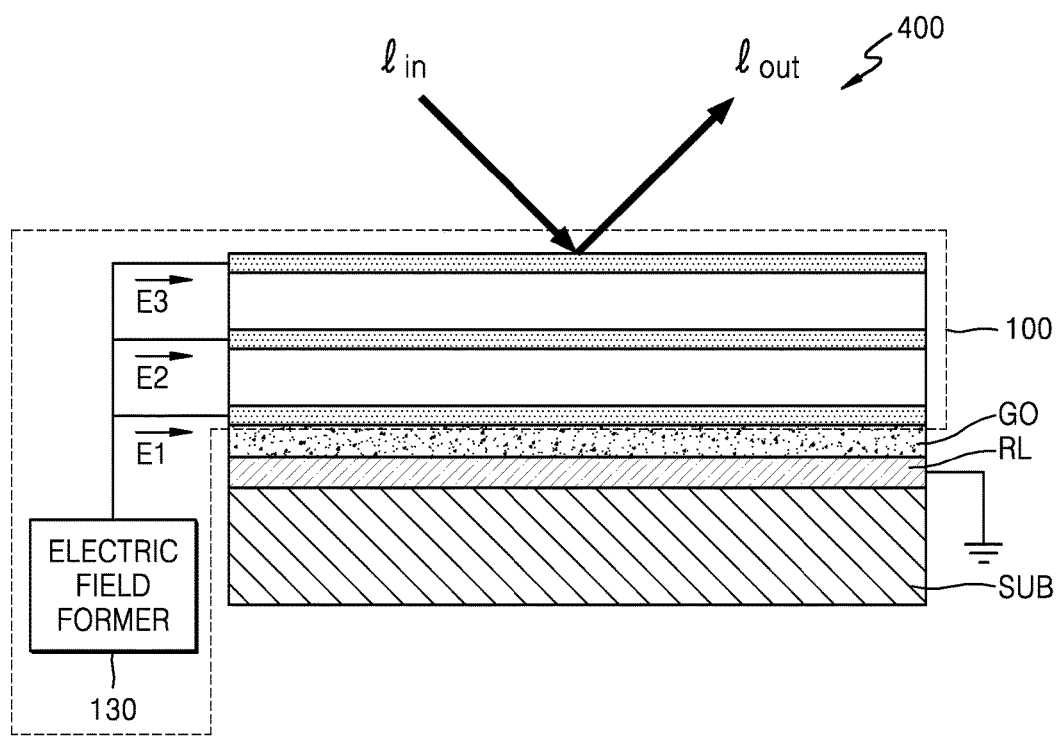
FIG. 5 is a schematic cross-sectional view of a device according to an example embodiment.
Figure 6:
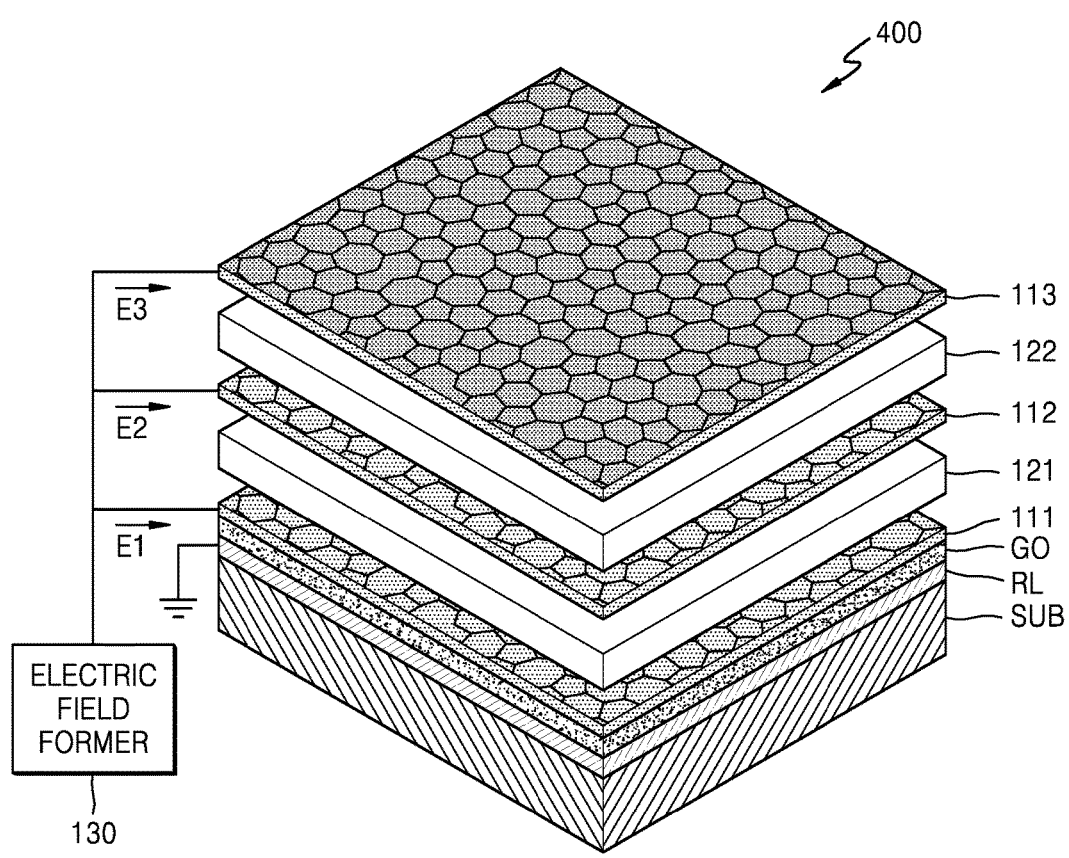
FIG. 6 is a schematic perspective view of the device of FIG. 5 according to an example embodiment.

FIG. 5 is a schematic cross-sectional view of a device 400 according to an example embodiment. FIG. 6 is a schematic perspective view of the device 400 of FIG. 5.

Referring to FIGS. 5 and 6, the device 400 may include a substrate SUB, a reflecting layer RL, a gate oxide GO, and the multi-stack graphene structure 100 of FIG. 1. The device 400 according to the present embodiment may function as a reflective light modulation device.

The substrate SUB may include all materials for supporting the device 400. For example, the substrate SUB may include a semiconductor material. As another example, the substrate SUB may include a light transmittance material. The reflection layer RL may reflect an incident light $l_{in}$ from an upper portion of the device 400. As an example, the reflecting layer RL may include a metallic material. For example, the reflecting layer RL may include Au. The gate oxide GO may electrically insulate the multi-stack graphene structure 100 and the reflecting layer RL. For example, the gate oxide GO may include a dielectric material. As an example, the gate oxide GO may include the same material as that of a thin film dielectric layer of the multi-stack graphene structure 100. For example, the gate oxide GO may include at least one of $Al_2O_3$, $HfO_2$, $SiO_2$, $Si_3N_4$, $ZrO_2$, and $Ta_2O_5$. However, the present disclosure is not limited thereto. The gate oxide GO may include a different material from that of the thin film dielectric layer of the multi-stack graphene structure 100. The gate oxide GO may have an optimal thickness $d_{GO}$ in order to form a maximum electric field with the multi-stack graphene structure 100. This will be described in detail with reference to FIG. 7 below.

Referring to FIG. 5, the device 400 may emit an emission light $l_{out}$ modulated from the incident light $l_{in}$ of the device 400 to the outside. The incident light $l_{in}$ may transmit through the multi-stack graphene structure 100 and the gate oxide GO, may be reflected from the reflecting layer RL, and then may transmit through the multi-stack graphene structure 100 and the gate oxide GO again. A light characteristic of the incident light $l_{in}$ may be modulated while transmitting through the multi-stack graphene structure 100. For example, amplitude, phase, and the like of the incident light $l_{in}$ may be modulated. A modulation degree of the incident light $l_{in}$ may be adjusted by the electric field former 130. The reflection layer RL may function as a ground in order for the electric field former 130 to effectively form an electric field in the graphene layer 110 of FIG. 1.

The device 400 may include a multi-stack graphene structure according to the above-described embodiment and is not limited to the multi-stack graphene structure 100 of FIG. 1. For example, when the device includes the multi-stack graphene structure 200, the device may be used as a beam steering device.

Figure 7:
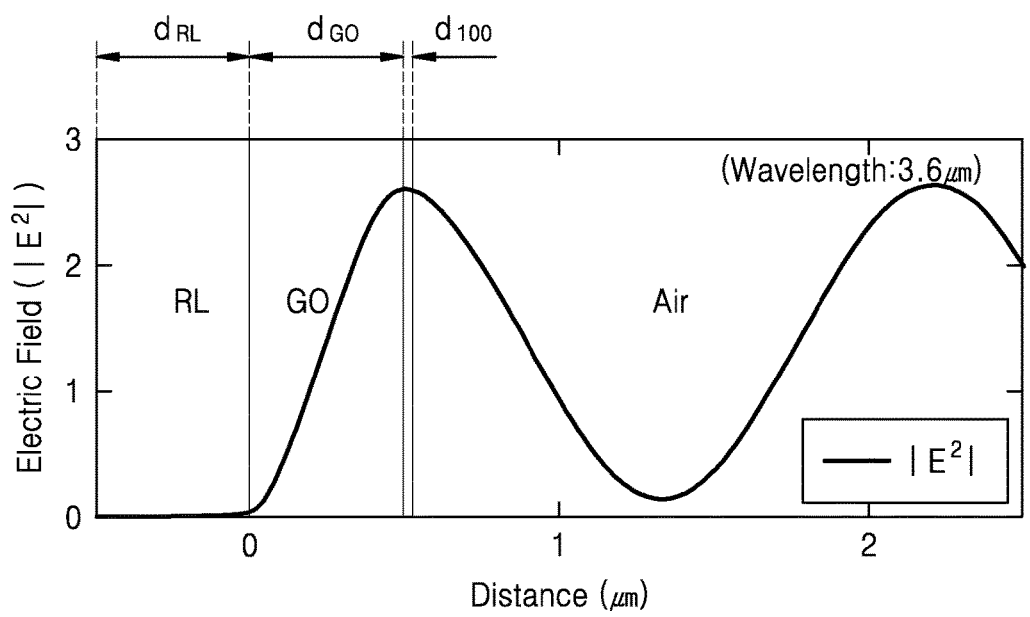
FIG. 7 is a graph of a simulation result for determining a thickness of a gate oxide according to an example embodiment.

FIG. 7 is a graph showing simulation results for determining a thickness of the gate oxide GO according to an example embodiment. The simulation was performed based on the device 400 of FIG. 6.

Referring to FIG. 7, the x-axis is a distance, and the y-axis of the graph is an intensity of an electric field. When a lower surface of the gate oxide GO of the device 400 is used as a reference distance of 0 μm, an upper surface of the gate oxide GO may correspond to $d_{GO}$, and an upper surface of the multi-stack graphene structure 100 may correspond to $d_{GO}+d_{100}$. Assuming that an operating wavelength of the device 400 is 3.6 μm, the intensity of the electric field of the device 400 with respect to the distance is shown in FIG. 7. Efficiency of an optical modulation of the device 400 may be enhanced when the multi-stack graphene structure 100 is located in a maximum point region of an electric field intensity function. Thus, the thickness $d_{GO}$ of the gate oxide GO may be determined such that the multi-stack graphene structure 100 is located in the maximum point region of the electric field intensity function. For example, the thickness $d_{GO}$ of the gate oxide GO may be about 500 nm.

Figure 8:
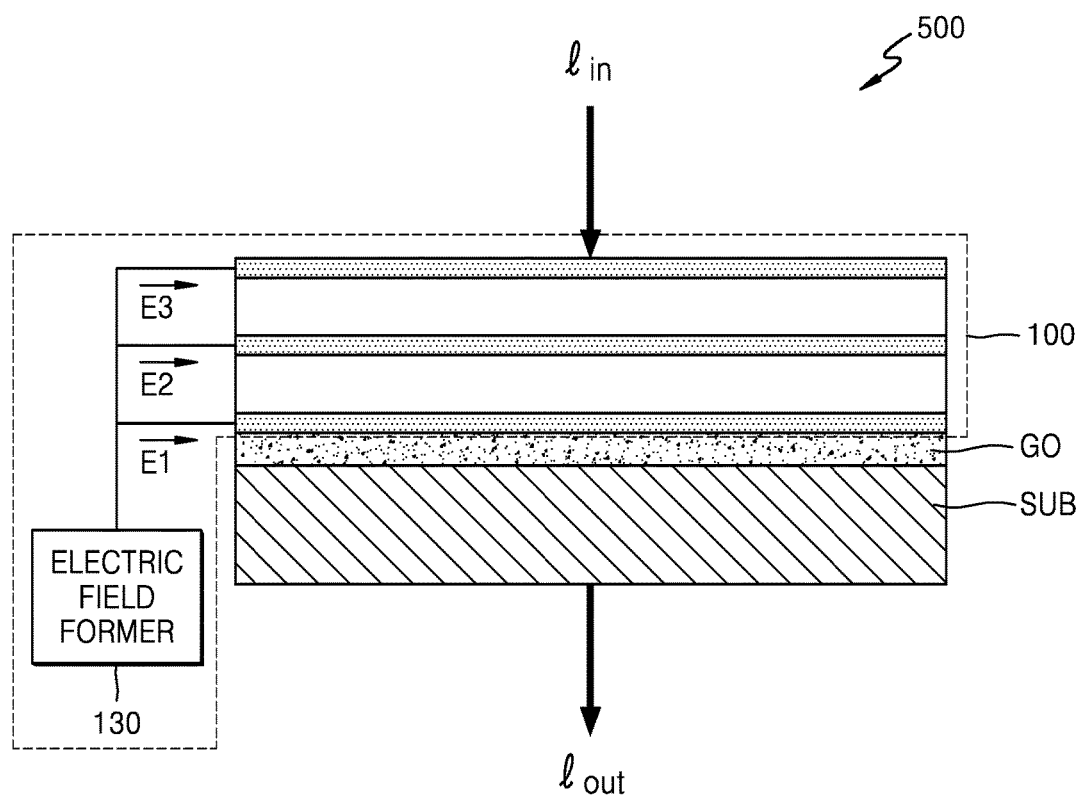
FIG. 8 is a schematic cross-sectional view of a device according to another example embodiment.

FIG. 8 is a schematic cross-sectional view of a device 500 according to another example embodiment. Referring to FIG. 8, the device 500 may include the gate oxide GO and the multi-stack graphene structure 100 of FIG. 1. The multi-stack graphene structure is not limited to the embodiment of FIG. 1 and may be any one of the multi-stack graphene structures according to the above-described embodiments. The device 500 according to the present embodiment may function as a transmission type light modulation device.

The substrate SUB may include all materials for supporting the device 500. The substrate SUB may include a material capable of transmitting light of an operating region of the device 500. For example, the substrate SUB may include glass or transparent plastic. The gate oxide GO may include a dielectric material. For example, the gate oxide GO may include the same material as that of a thin film dielectric layer of the multi-stack graphene structure 100. As an example, the gate oxide GO may include $Al_2O_3$. However, the present disclosure is not limited thereto. The gate oxide GO may include a different material from that of the thin film dielectric layer of the multi-stack graphene structure 100. For example, a thickness of the gate oxide GO may be in a range such that the light of the operating region of the device 500 may pass through the gate oxide GO. As an example, the thickness of the gate oxide GO may be determined such that the multi-stack graphene structure 100 is located at a first maximum point of an electric field intensity graph.

Figure 9:
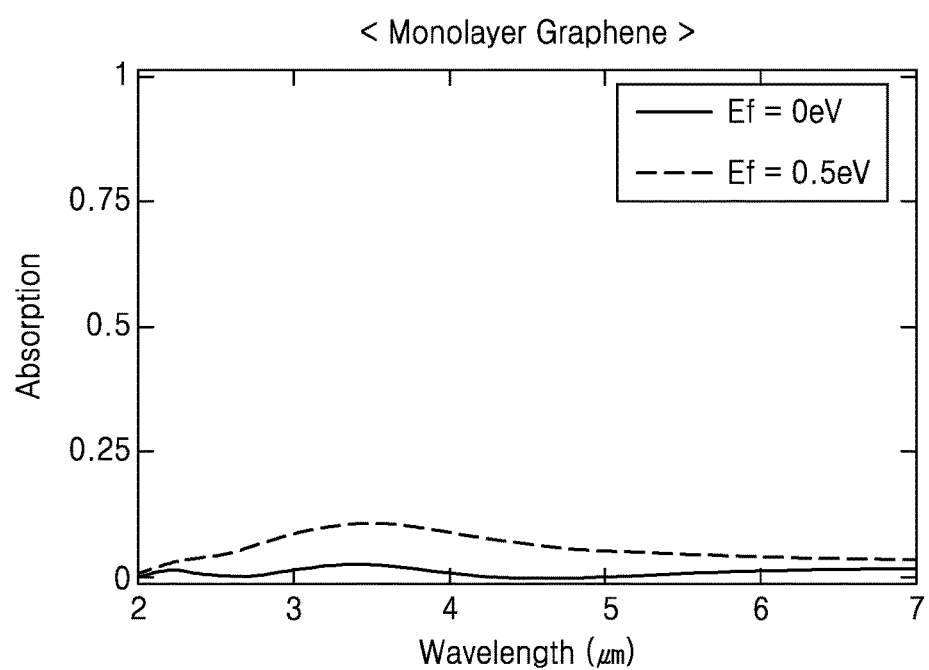
FIG. 9 is a graph of an absorption characteristic of monolayer graphene according to an example embodiment.
Figure 10:
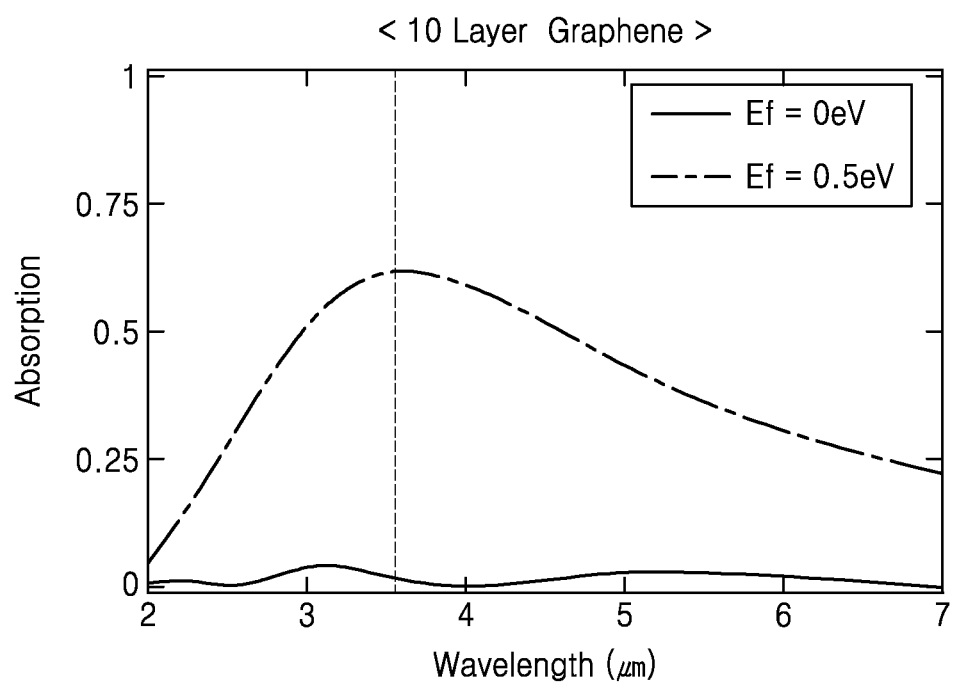
FIG. 10 is a graph of an absorption characteristic of a multi-stack graphene structure according to an example embodiment.
Figure 11:
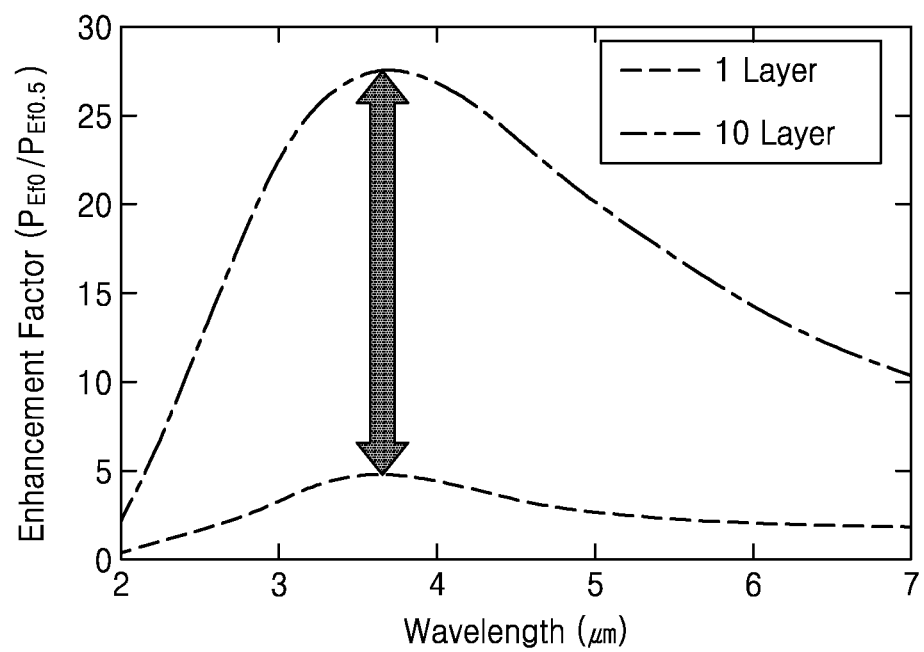
FIG. 11 is a graph of comparing performances of monolayer graphene and a multi-stack graphene structure according to an example embodiment.

FIG. 9 is a graph of an absorption characteristic of monolayer graphene. FIG. 10 is a graph of an absorption characteristic of a multi-stack graphene structure. FIG. 11 is a graph comparing performance of the monolayer graphene and the multi-stack graphene structure.

Referring to FIG. 9, the x-axis of the graph represents a wavelength (in μm) of light, and the y-axis of the graph represents an optical absorption. A device including a monolayer graphene was used in simulation. In the capacitor structure like device 400 and 500, applying electric field may tune the Fermi-level (Ef) of graphene through charge doping effect. When the electric field is not applied, the Fermi-level is zero. The case in which an electric field was not applied to graphene is shown as a solid line. A case in which the Fermi-level of graphene is 0.5 eV is shown as a dotted line. A ratio of the optical absorption of the dotted line and the optical absorption of the solid line may be defined as an enhancement factor. Referring to FIG. 11, the enhancement factor of the device including the monolayer graphene is shown as a dotted line.

Referring to FIG. 10, the x-axis of the graph represents the wavelength (in μm) of light, and the y-axis of the graph represents an optical absorption. A device including 10 graphene stacks was used in simulation. The case in which an electric field was not applied to graphene is shown as a solid line. The case in which the Fermi-level of graphene is 0.5 eV is shown as a chain line. A ratio of the optical absorption of the dotted line and the optical absorption of the solid line may be defined as an enhancement factor. Referring to FIG. 11, the enhancement factor of the device including the 10 graphene stacks is shown as a chain line.

Upon comparing FIGS. 9 and 10, the maximum value of efficiency of optical absorption of the device including the 10 graphene stacks is about 0.6, whereas the efficiency of optical absorption of a device that does not have a multi-stack graphene structure is about 0.15 when subjected to the Fermi-level of 0.5 eV. Referring to FIG. 11, the enhancement factor of the device including the 10 graphene stacks shown as the chain line is more than 7 times the enhancement factor of the device including the monolayer graphene shown as the dotted line. Thus, the efficiency of optical absorption of the multi-stack graphene structure may be enhanced as compared to a single graphene structure.

Figure 12:
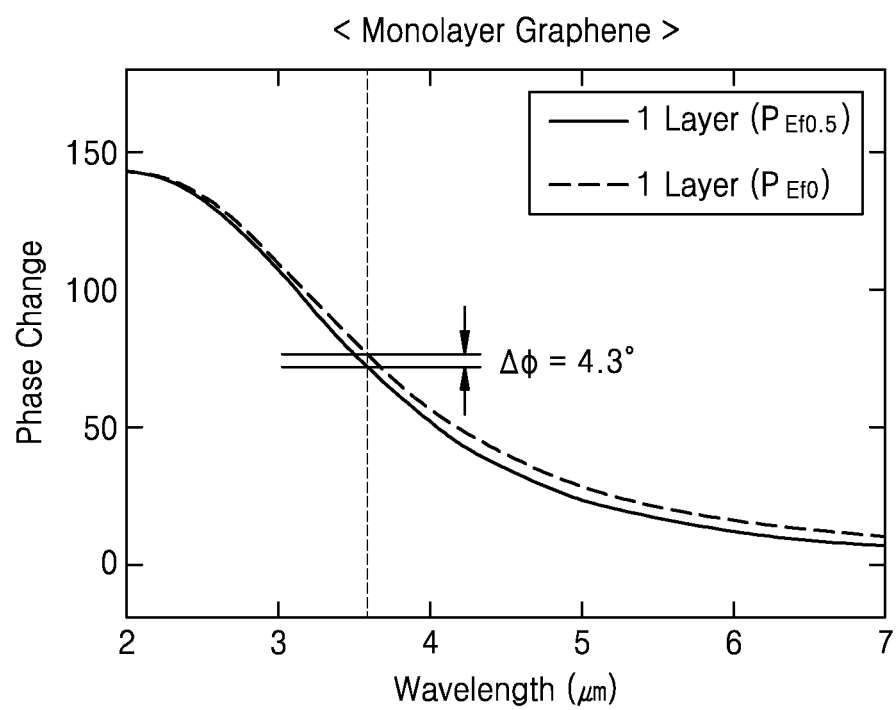
FIG. 12 is a graph of a phase change characteristic of monolayer graphene according to an example embodiment.
Figure 13:
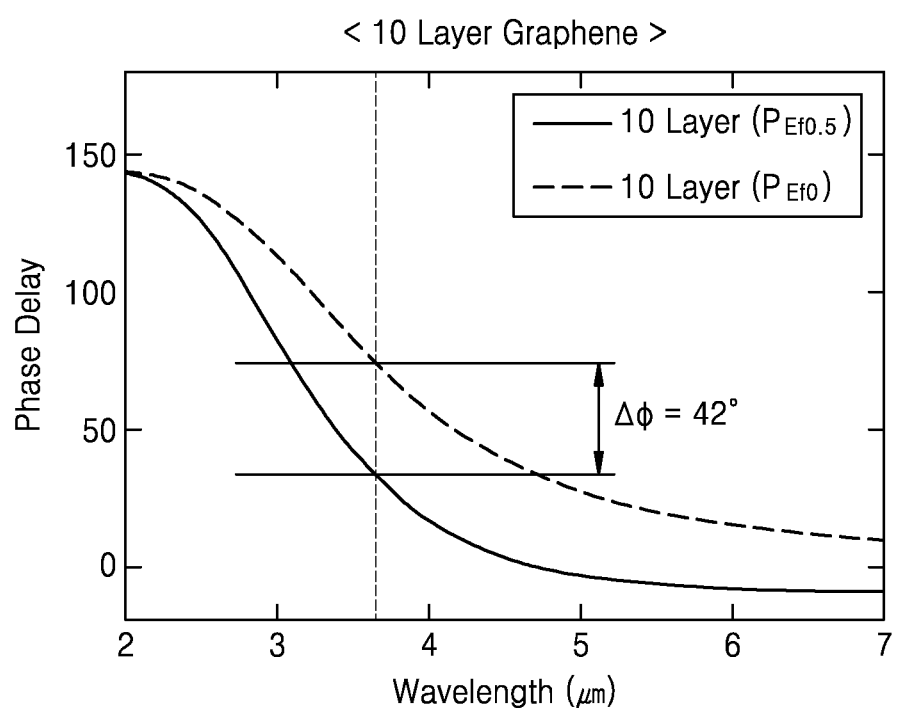
FIG. 13 is a graph of a phase change characteristic of a multi-stack graphene structure according to an example embodiment.

FIG. 12 is a graph showing a phase change characteristic of a monolayer graphene. FIG. 13 is a graph showing a phase change characteristic of a multi-stack graphene structure.

Referring to FIG. 12, the x-axis of the graph represents a wavelength (in μm) of light, and the y-axis of the graph represents a phase change (in degrees). A device including a monolayer graphene was used in simulation. The case in which an electric field was not applied to graphene is shown as a broken line. The case in which Fermi-level of graphene is 0.5 eV was is shown as a solid line. The difference between the case in which the electric field was applied to graphene and the case in which no electric field was applied to graphene is 4.3° at 3.6 μm, which is an operating region of the device.

Referring to FIG. 13, the x-axis of the graph represents the wavelength (in μm) of light, and the y-axis of the graph represents the phase change (in degrees). A device including 10 graphene stacks was used in simulation. The case in which an electric field was not applied to graphene is shown as a broken line. The case in which Fermi-level of graphene is 0.5 eV is shown as a solid line. The difference between the case in which the electric field was applied to graphene and the case in which no electric field was applied to graphene is 42° at 3.6 μm, which is an operating region of the device.

Upon comparing FIGS. 12 and 13, the phase change of the device including 10 graphene stacks is more than 9 times the phase change of the device including the monolayer graphene upon application of an electric field of 0.5 eV. Thus, the efficiency of optical modulation of the multi-stack graphene structure may be enhanced as compared to a single layer graphene structure.

Figure 14:
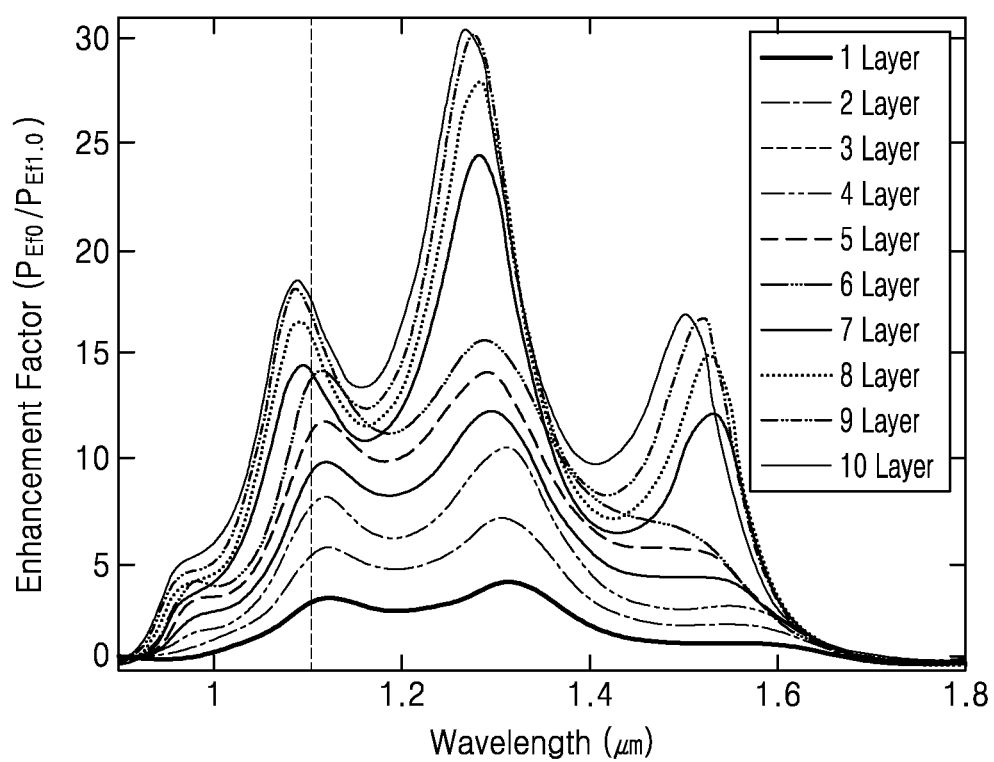
FIG. 14 is a graph comparing performance of a multi-stack graphene structure based on the number of stacks present according to an example embodiment.
Figure 15:
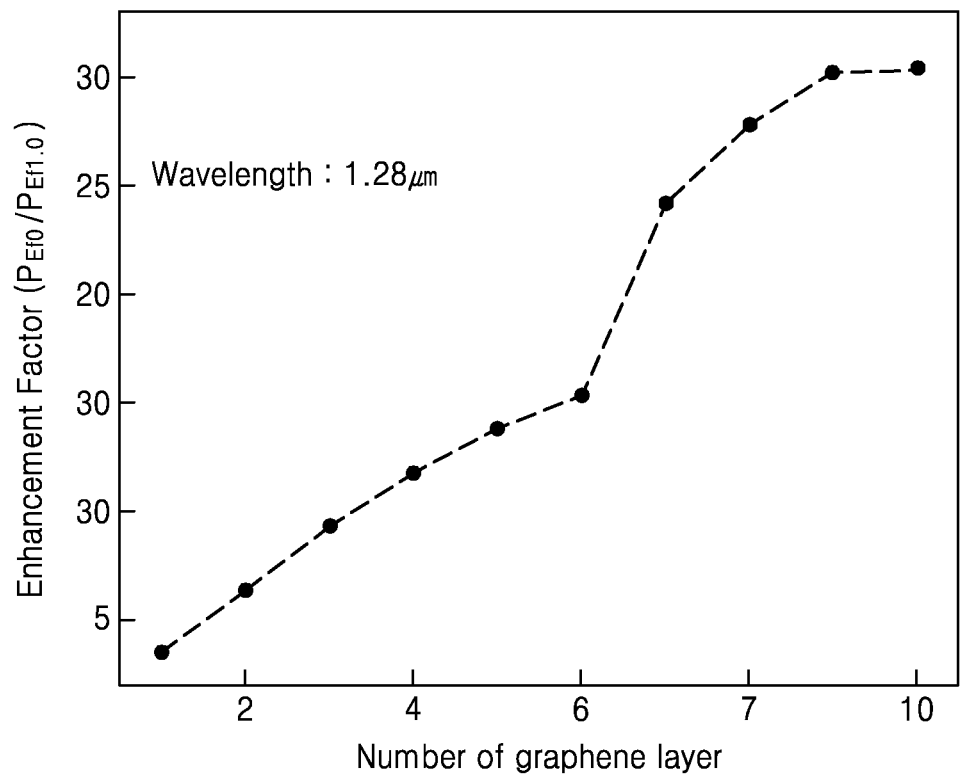
FIG. 15 is a graph comparing the performance of a multi-stack graphene structure based on the number of stacks present according to an example embodiment.

FIG. 14 is a graph comparing the performance of a multi-stack graphene structure according to the number of stacks present. FIG. 15 is also a graph comparing the performance of a multi-stack graphene structure according to the number of stacks. Referring to the graphs of FIGS. 14 and 15, the efficiency of optical modulation of a device was simulated by increasing the number of graphene stacks of the device from 1 to 10.

Referring to FIG. 14, the x-axis is the wavelength of light (in μm), and the y-axis is the enhancement factor. This has been described previously with respect to FIGS. 9 through 11, and as such the description is not repeated here. As the number of graphene stacks increases, the enhancement factor of the device may gradually increase, as shown in FIG. 14.

Referring to FIG. 15, the x-axis of the graph represents the number of graphene stacks, and the y-axis of the graph represents the value of the enhancement factor of the graph of FIG. 14 with respect to 1.28 μm, which is an operating wavelength of a device. As the number of graphene stacks increases, the enhancement factor of the device may also gradually increase.

Figure 16:
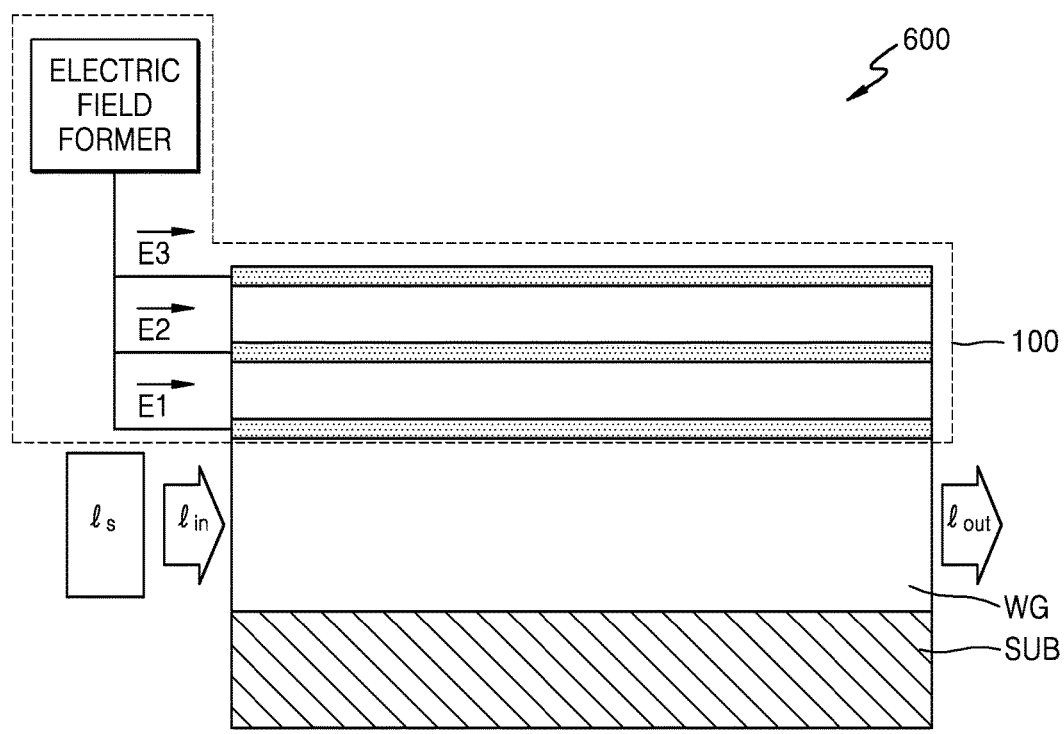
FIG. 16 is a schematic cross-sectional view of a device according to another example embodiment.

FIG. 16 is a schematic cross-sectional view of a device 600 according to another example embodiment. Referring to FIG. 16, the device 600 may include a substrate SUB, a waveguide WG, and the multi-stack graphene structure 100 of FIG. 1. The multi-stack graphene structure is not limited to the multi-stack graphene structure 100 of FIG. 1 and may include any one of the multi-stack graphene structures described above. For example, when the device includes the multi-stack graphene structure 200, the device may function as a beam steering device. The device 600 according to the present embodiment may function as an optical modulator.

The waveguide WG may guide light in one direction via total reflection. For example, a light source $l_s$ may irradiate the incident light $l_{in}$ to one surface of the waveguide WG. The waveguide WG may allow the incident light $l_{in}$ irradiated to the inside to propagate along WG without loss of light and emitted as the emission light $l_{out}$. As an example, the waveguide WG may have a higher refractive index than peripherals including the substrate SUB. The multi-stack graphene structure 100 may be provided on one surface of the waveguide WG. For example, the multi-stack graphene structure 100 may be provided on an upper surface or a lower surface of the waveguide WG.

A dielectric layer (not shown) may be further provided between the multi-stack graphene structure 100 and the waveguide WG. The dielectric layer may include at least one of $Al_2O_3$, $HfO_2$, $SiO_2$, $Si_3N_4$, $ZrO_2$, and $Ta_2O_5$. A thickness of the dielectric layer may be such that the multi-stack graphene structure 100 and the waveguide WG may be electrically insulated from each other.

A multi-stack graphene structure 100 that is electrically tunable may be provided on the waveguide WG, and thus electrical characteristics of the device 600 including the waveguide WG may be modulated. The device 600 may enhance performance of an electronic modulator by coupling the multi-stack graphene structure 100 and an evanescent wave passing through the waveguide WG. For example, by employing the multi-stack graphene structure 100, a length for coupling graphene and the evanescent wave passing though the waveguide WG may be extended. For example, the device 600 may perform a broadband operation across a wide operating region. As an example, the device 600 may include the multi-stack graphene structure 100, thereby performing at a fast operating speed. For example, since the device 600 may include the multi-stack graphene structure 100, the device 600 may be produced through a general CMOS, and thus production costs may be reduced.

The device 600 may further include a grating (not shown) provided in at least one surface of the waveguide WG which is capable of coupling light or emitting the light to the outside. For example, the grating may be provided in one surface to which the incident light $l_{in}$ is coupled. As another example, the grating may be provided in one surface from which the emission light $l_{out}$ is emitted. The grating may include various kinds of 1D and 2D grating, and is not limited to a special type of grating. For example, the grating may include a line and space grating. As another example, the grating may be a 2D grating in which 2D patterns are periodically repeated. The 2D patterns may have various shapes, including those of a polygon, a circle, an oval, and the like, and are not limited to a special shape.

A multi-stack graphene structure according to the present disclosure may include a plurality of graphene stacks, thereby enhancing optical characteristic modulation efficiency. A graphene stack may include amorphous graphene so as to provide for the formation of a thin film dielectric layer having a small thickness. Thus, the total thickness of the multi-stack graphene structure including the plurality of graphene stacks may be small, for example several tens of nm. In addition, a thickness of the thin film dielectric layer may be small, and thus any spaces between the plurality of graphene stacks may be reduced, thereby enhancing the efficiency of an electric field.

A device according to the present disclosure may include the multi-stack graphene structure, thereby performing various optical modulation functions. For example, the device may perform functions of an optical modulator, an electronically tunable meta-surface lens, a beam steering device, a lidar device, and the like.

To promote understanding of the inventive concept, examples of a multi-stack graphene structure and a device including the multi-stack graphene structure have been illustrated in the accompanying drawings. It should be understood that the example embodiments described herein should be considered to be descriptive only, and do not serve to limit the present disclosure. Descriptions of features or aspects within each example embodiment should typically be considered as being available for use in other similar features or aspects in other example embodiments.

While one or more example embodiments have been described with reference to the figures, it will be understood by those of ordinary skill in the art that various changes in form and details may be made therein without departing from the spirit and scope of the present disclosure as defined by the following claims.

What is claimed is:

1. A multi-stack graphene structure comprising:
    a plurality of graphene layers spaced apart from each other, each of the plurality of graphene layers comprising amorphous graphene;
    a plurality of thin film dielectric layers respectively provided between each graphene layer of the plurality graphene layers; and
    an electric field former configured to apply an electric field to each of the plurality of graphene layers.

2. The multi-stack graphene structure of claim 1, wherein the amorphous graphene is an amorphous single carbon atomic layer.

3. The multi-stack graphene structure of claim 1, wherein the plurality of thin film dielectric layers comprise at least one material selected from the group consisting of $Al_2O_3$, $HfO_2$, $SiO_2$, $Si_3N_4$, $ZrO_2$, and $Ta_2O_5$.

4. The multi-stack graphene structure of claim 1, wherein the amorphous graphene is present in a form of a pattern.

5. The multi-stack graphene structure of claim 4, wherein the pattern is one of a one-dimensional (1D) pattern and a two-dimensional (2D) pattern.

6. The multi-stack graphene structure of claim 1, wherein each of the plurality of thin film dielectric layers has a thickness less than 20 nm.

7. The multi-stack graphene structure of claim 1, wherein the plurality of thin film dielectric layers are formed by using atomic layer deposition.

8. A device comprising the multi-stack graphene structure of claim 1.

9. The device of claim 8, further comprising:
a substrate; and
a gate oxide on the substrate,
wherein the multi-stack graphene structure is provided on the gate oxide.

10. The device of claim 9, further comprising a reflecting layer provided between the substrate and the gate oxide.

11. The device of claim 9, wherein the gate oxide and the plurality of thin film dielectric layers comprise a same material.

12. The device of claim 9, wherein the gate oxide and the plurality of thin film dielectric layers comprise different materials.

13. The device of claim 8, further comprising:
a substrate; and
a waveguide on the substrate,
wherein the multi-stack graphene structure is provided on an upper portion or a lower portion of the waveguide.

14. The device of claim 13, further comprising a light source configured to emit light to one surface of the waveguide.

15. The device of claim 13, further comprising a dielectric layer between the waveguide and the multi-stack graphene structure.

16. The device of claim 13, further comprising a grating provided in at least one surface of the waveguide and configured to couple light to an inside of the waveguide or emit the light to an outside of the waveguide.

17. The multi-stack graphene structure of claim 1, the plurality of graphene layers is 3 to 10 graphene layers.

18. The multi-stack graphene structure of claim 1, the plurality of graphene layers is 7 to 10 graphene layers.

19. The multi-stack graphene structure of claim 17, wherein each of the plurality of thin film dielectric layers has a thickness less than 20 nm.

20. The multi-stack graphene structure of claim 18, wherein each of the plurality of thin film dielectric layers has a thickness less than 20 nm.

21. The multi-stack graphene structure of claim 18, wherein each of the plurality of thin film dielectric layers has a thickness less than 20 nm, and each of the plurality of graphene layers has a thickness less than 1 nm.

22. The multi-stack graphene structure of claim 1, wherein each of the plurality of thin film dielectric layers has a thickness less than 20 nm, and each of the plurality of graphene layers has a thickness less than 1 nm.

* * * * *